United States Patent [19]

Maier

[11] Patent Number: 4,804,902

[45] Date of Patent: Feb. 14, 1989

[54] LINEAR, LOW EMI/RFE FAN CONTROL CIRCUIT

[75] Inventor: Craig P. Maier, Verona, N.J.

[73] Assignee: Hewlett-Packard Company, Palo Alto, Calif.

[21] Appl. No.: 51,894

[22] Filed: May 19, 1987

[51] Int. Cl.⁴ .............................................. H02P 5/40
[52] U.S. Cl. ............................. 318/798; 318/345 CB; 318/806
[58] Field of Search ................ 318/345 B, 345 F, 812, 318/779, 798, 806, 345 CB

[56] References Cited

U.S. PATENT DOCUMENTS

| | | | |
|---|---|---|---|
| 3,324,372 | 6/1967 | Myers | 318/345 G |
| 3,389,315 | 6/1968 | Andreas et al. | 318/779 |
| 4,658,197 | 4/1987 | Ligman | 318/812 |

Primary Examiner—David Smith, Jr.
Attorney, Agent, or Firm—Donald N. Timbie

[57] ABSTRACT

A circuit is described for controlling the speed of an A.C. motor driving a cooling fan in response to the temperature at a point being cooled in which a temperature responsive impedance is used to control the current in an impedance of the output circuit of an amplifier that is connected in series or parallel with the windings of the motor.

6 Claims, 4 Drawing Sheets

LINEAR, LOW EMI/RFE FAN CONTROL CIRCUIT

BACKGROUND OF THE INVENTION

In order to ensure that the temperature of at some point in an equipment does not exceed a safe operating limit, it has been customary to use a cooling fan operating at a speed required for the worst case situation determined by such factors as ambient temperature, line voltage, and in some electronic systems the electrical load applied to the system. The audible noise produced by operation in this manner can be very objectionable to the user of the equipment so that it would be advantageous to reduce the speed of the fan when circumstances permit. This can be effected by thermally coupling a temperature responsive impedance such as a thermistor to an appropriate point in the equipment and controlling the speed of the fan in accordance with the temperature thereof. When the fan is driven by a D.C. motor, its speed can be easily controlled by varying the voltage applied to the motor as a function of the value of the temperature responsive impedance, but when the fan is driven by an A.C. motor, variation in speed is usually achieved by a phase control circuit that produces electrical noise, EMI/RFI. Unfortunately, the noise may have an adverse effect on the performance of nearby circuits that may be in the equipment being cooled or in other equipment. The electrical noise can also prevent the apparatus from passing radiation limits mandated by regulatory agencies such as the FCC in the U.S.A. or the VDE in Germany.

BRIEF SUMMARY OF THE INVENTION

In accordance with the invention, the speed of an alternating current motor for driving a cooling fan is controlled by connecting its winding in parallel or series with the output circuit of an amplifier and applying a voltage to the input circuit of the amplifier that has an amplitude depending on the temperatures of one or more temperature responsive impedances. To perform the latter junction a series circuit comprised of a resistor and a temperature responsive impedance is coupled between the input terminals to which the winding is coupled, and the junction of the resistor and impedance is coupled to the input circuit of the amplifier so as to vary the current in the output circuit, and hence its impedance, in accordance with the temperature of the temperature responsive impedance.

The output circuit for the amplifier and the series circuit may be coupled to the terminals by the same or different full wave rectifying means so that the voltages applied across the output circuit and to the input circuit may be in phase and such as to produce a current in the output circuit having an amplitude that depends on the temperature of the temperature responsive impedance.

Alternatively, the series circuit may be coupled to the terminals so that the voltage at the junction of the resistor and temperature responsive impedance is an alternating current voltage. In this case two oppositely poled amplifying means are coupled in parallel between the terminals, and the junction of the resistor and temperature responsive impedance is coupled to the input circuits of the amplifiers in such manner that one amplifier conducts during one half cycle and the other amplifier conducts during the other half cycle. The amount of conduction during each half cycle is determined by the amplitude of the in phase voltage applied to the input circuit.

In another circuit the output circuit of a first amplifier and a first diode are coupled in series between the terminals so as to conduct during one half cycle, and the output circuit of a second amplifier and second diode are coupled in series between said terminals so as to conduct during an adjacent half cycle. The junctions of the diodes and the output circuits with which they are respectively connected are connected to a common electrical point. A first resistor and a temperature responsive impedance are coupled in series between one terminal and the common point and a second resistor is connected in series with the temperature responsive impedance between the other terminal and said common point. The junction of the first resistor and the temperature responsive impedance is coupled to the input circuit of the first amplifier so as to apply a voltage thereto that is in phase with the voltage across its output circuit, the polarities of said voltages being such as to cause current to flow in the output circuit during one half cycle. The junction of the second resistor and the temperature responsive impedance is coupled to the input circuit of the second amplifier so as to apply a voltage thereto that is in phase with the voltage across its output circuit, the polarities of said voltages being such as to cause current to flow in the output circuit during an adjacent half cycle.

DETAILED DESCRIPTION OF THE INVENTION

Figure 1:
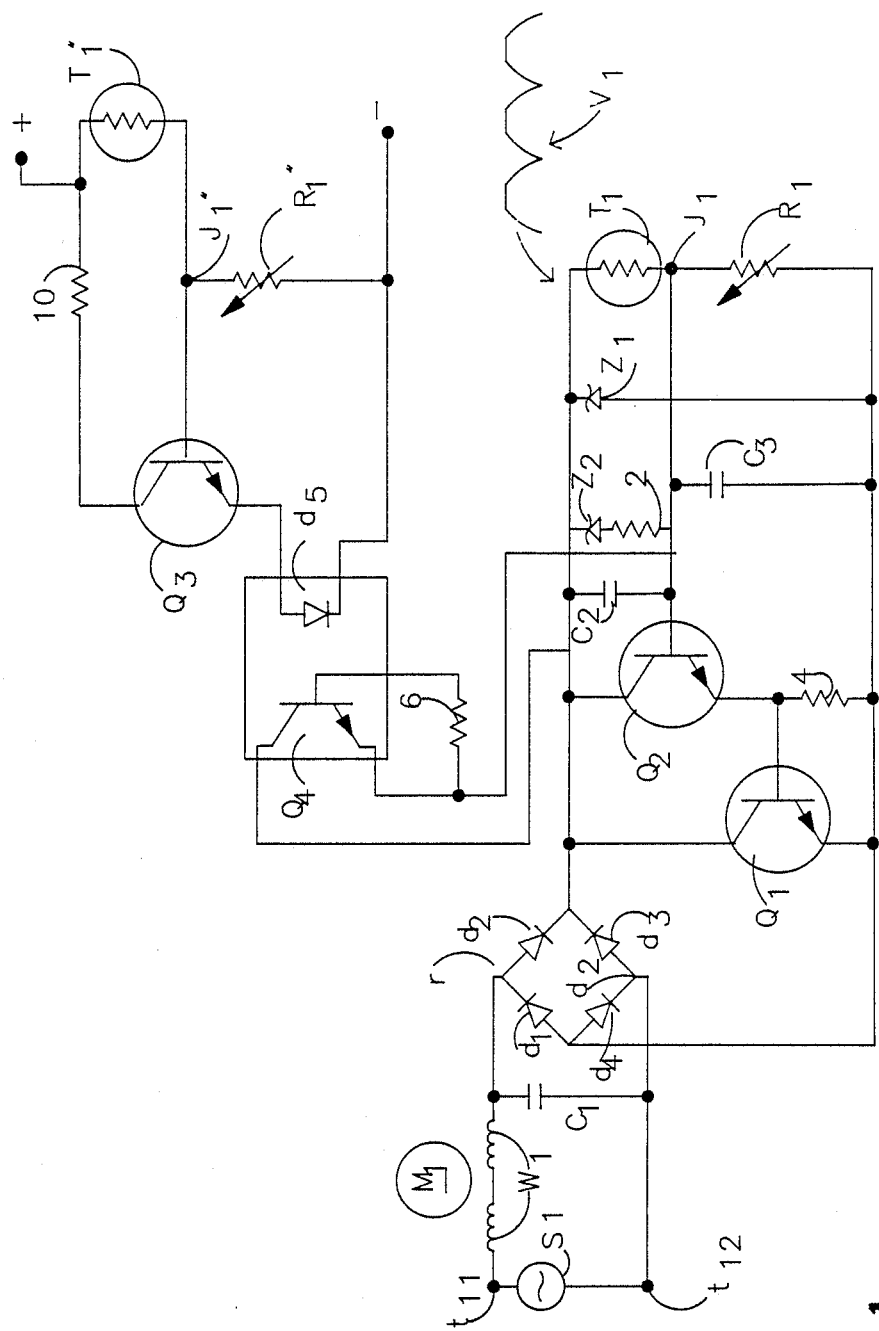
FIG. 1 is a schematic representation of a preferred circuit incorporating the invention in which the winding of an alternating current motor is coupled via a full wave rectifier in series with the output circuit of an amplifier having its input circuit coupled to the junction of a resistor and temperature responsive impedance that are connected in series parallel with the output circuit.

In the preferred embodiment of the invention shown in FIG. 1 a source $S_1$ of energizing voltage is connected between terminals $t_{11}$ and $t_{12}$. The winding $W_1$ of an alternating current motor $M_1$ is connected in series with a diode of a full wave bridge rectifier r, the output circuit of a transistor amplifier $Q_1$ and another diode of the rectifier r between the terminals $t_{11}$ and $t_{12}$. When $t_{11}$ is positive, current flows from it through the winding $W_1$ and diode $d_2$ to the collector of the transistor $Q_1$, through the collector to emitter path of $Q_1$, and via a diode $d_4$ to the terminal $t_{12}$. When $t_{12}$ is positive, the current path is via a diode $d_3$, the output circuit of $Q_1$, diode $d_l$, and the winding $W_1$ to the terminal $t_{11}$. It is thus seen that the winding $W_1$ is in series with the output circuit of $Q_1$ so that variation in the resistance of the output circuit of $Q_1$ will change the current in $W_1$ and hence the speed of the motor $M_1$. The winding $W_1$ is therefore coupled to the output circuit of $Q_1$ in such manner that variation in the impedance of the latter changes the current in $W_1$. The junction of $d_1$ and $d_2$ is one end of a first diagonal of the bridge, and the junction of $d_3$ and $d_4$ is the other end of the first diagonal. The junction of $d_3$ and $d_4$ is one end of a second diagonal, and the junction of $d_2$ and $d_3$ is the other end.

In order to vary the current in $W_1$ with variation in the temperature of a given point in an equipment, a series circuit comprised of a temperature responsive impedance $T_1$, which may be a thermistor, and a resistor $R_1$ is coupled between the terminals $t_{11}$ and $t_{12}$. In this circuit the coupling is via an isolating resistor $IR_1$ and the rectifier r. A Zener diode $Z_1$ is preferably connected in parallel with the series circuit $T_1$, $R_1$ so that a clipped fully rectified voltage wave $V_1$ appears across it. The junction $J_1$ of $T_1$ and $R_1$ is coupled to the input circuit of $Q_1$ via $Q_2$ that is coupled to $Q_1$ in a Darlington configuration. The voltage thus applied to the input circuit oi $Q_1$ is therefore a fully rectified wave that is in phase with the fully rectified voltage wave applied across its output circuit. The temperature responsive impedance $T_1$ is located so that its resistance is primarily influenced by the temperature of the point in the equipment that is to be kept below a given value.

In this particular circuit, the transistor $T_1$ has a negative temperature coefficient so that its resistance reduces as its temperature increases, thereby increasing the voltage at the base of $Q_2$. When this voltage is greater than 2Vbe, current starts flowing through $Q_2$ and $Q_1$ and through the motor winding $W_1$. With the circuit as thus far described, the motor $M_1$ does not turn at lower temperatures so as not to create any unnecessary noise. The temperature at which the motor $M_1$ starts turning can be set by adjusting the value of the resistor $R_1$. With the Zener diode $Z_1$, the setting can be made more accurately. As the temperature rises above this value, the motor $M_1$ turns faster because the resistance of the output circuit of $Q_1$ decreases. If the position of $T_1$ and $R_1$ are exchanged, it is apparent that the temperature coefficient of $T_1$ would have to be positive.

As most people expect a fan to turn when power is applied to the equipment, they might think there was a defect when the fan does not start. This may be avoided by connecting a Zener diode $Z_2$ in series with a resistor 2 between the collector and base of $Q_2$. Even when the equipment is cool, the motor $M_1$ will turn the fan at a speed determined by the value of the voltage across the zener diode $Z_2$. The speed can be set so low as to not be audible.

In order to reduce the effect that spikes of noise on the A.C. line have on this circuit, a capacitor $C_1$ is connected in shunt with the rectifier r. A capacitor $C_2$ is connected between the collector and base of $Q_2$ in order to stabilize the servo loop formed by the fan and the temperature responsive impedance circuit. In order to reduce noise that may be picked up from other sources in the equipment, such as a switching power supply that may be present, a capacitor $C_3$ is connected between the base of $Q_2$ and the emitter of $Q_1$. A resistor 4, that may or may not be used is connected between the emitter of $Q_2$ and the emitter of $Q_1$ in order to control the beta of $Q_1$ and hence the rate at which the speed of the motor increases with temperature.

In some situations it is desireable to keep each of a plurality of points in a given piece of equipment that may be at different voltage potentials below respective temperatures. A way of achieving this result is illustrated in FIG. 1. A temperature responsive impedance $T_1''$ that may be in thermal contact with a point in an equipment that has a temperature different from the temperature of the point with which the temperature responsive impedance $T_1$ is in contact is connected in series with a resistor $R_1''$ between points of positive and negative voltages provided by any suitably isolated means. A resistor 10, the collector to the emitter path of a transistor $Q_3$ and a light emitting diode $d_5$ are connected in series between the points of positive and negative voltage, and the junction $J_1''$ of $R_1''$ and $T_1''$ is connected to the base of $Q_3$ so as to control the current in its collector to emitter path in accordance with the temperature of $T_1''$.

It is arranged that the light emitted by the diode $d_5$ fall upon the light sensitive region of a transistor $Q_4$ so as to change its current gain, and a resistor 6 is connected between the base of $Q_4$ and its emitter. The collector of $Q_4$ is connected to the collector of $Q_2$, and the emitter of $Q_4$ is connected to the base of $Q_2$ so as to form a Darlington configuration between $Q_4$ and $Q_2$. Thus, when the temperature of $T_1''$ becomes high enough to produce an effective voltage at the base of $Q_4$ in excess of 2Vbe, current starts to flow in the output circuit of $Q_1$ and increases the speed of the fan driven by the motor $M_1$. Thus the fan can be controlled by the temperature of either temperature responsive impedance acting alone or by both acting together. Only one temperature sensor will control the loop at any given time.

In other situations it may be desireable to control the speed of the fan motor $M_1$ with a programmed microprocessor. This can be done by translating the analog voltage at the junction $J_1$ to digital form, processing it in accordance with an algorithm in a microprocessor not shown, converting the digital output of the microprocessor to analog form and using it to control the current in $Q_3$ and hence the amount of light emitted by the diode $d_5$, $Q_4$. The microprocessor and the equipment being cooled are electrically isolated. This also has the advantage of being able to provide a voltage or signal indicative of the actual temperature of the temperature responsive impedance $T_1$.

Figure 2:
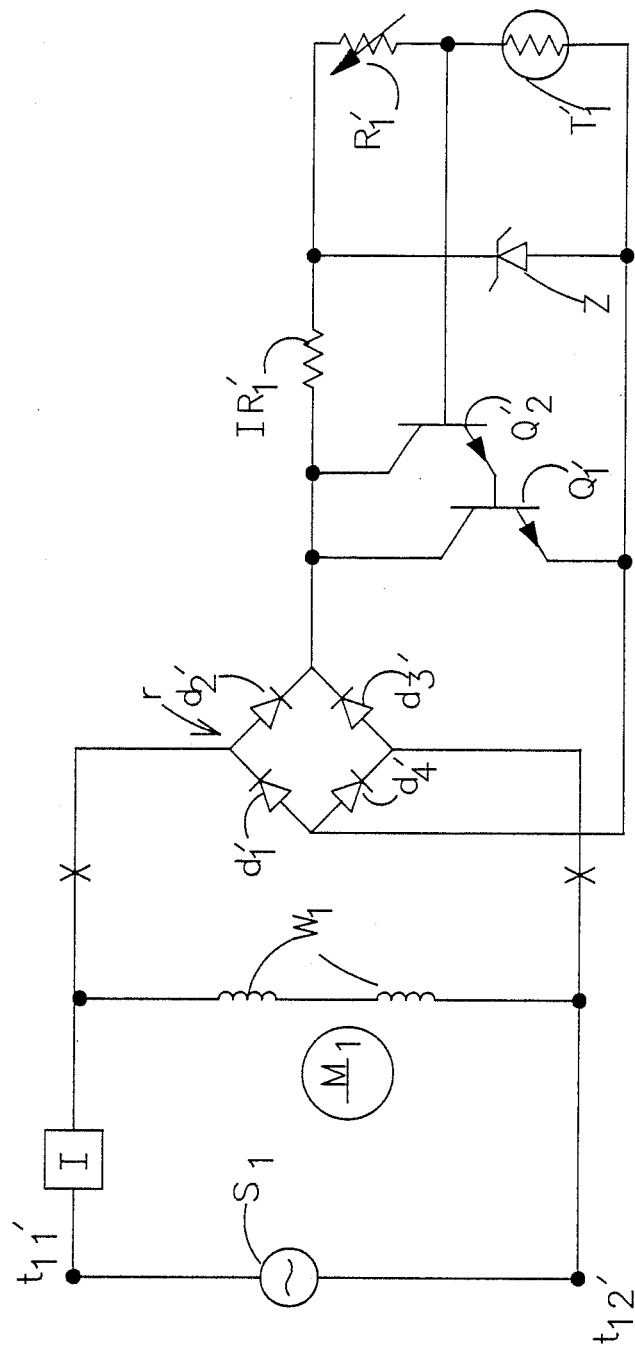
FIG. 2 is similar to FIG. 1 except that the winding of the A.C. motor is connected parallel with the output circuit of the amplifier.

In FIG. 2 components having functions generally corresponding to those of FIG. 1 have the same designations primed. The main differences are that the winding $W_1'$ of the motor $M_1'$ is connected in shunt with the output circuit of $Q_140$ rather than in series with it as in FIG. 1, and an isolating impedance I is connected between $t_1''$, and one end of the winding $W_1'$. When $T_1'$ is cool, its resistance is large so that less current flows through the output circuit of $Q_1'$, thereby causing more current to flow through the winding $W_1'$ as required. The impedance I is required because otherwise the current through $W_1'$ would remain the same regardless of the amount of current flowing in the output circuit of $Q_1'$, assuming, of course, that $S_1$ maintains its voltage.

Figure 3:
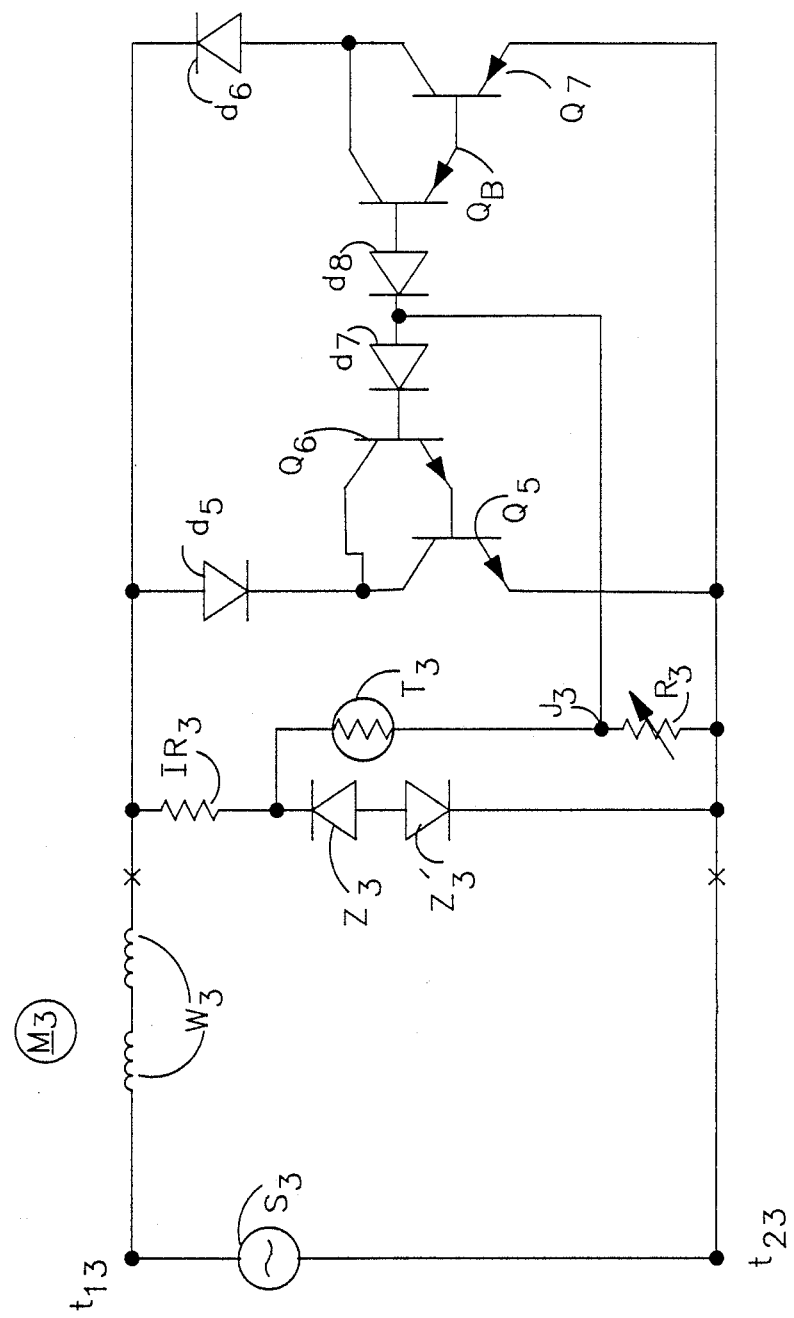
FIG. 3 is a circuit incorporating the invention in which two oppositely poled amplifiers are coupled in parallel between the terminals, and the junction of a resistor and temperature responsive impedance that are connected in series between the terminals is coupled to the input circuits of the amplifiers.

Reference is now made to FIG. 3 in which a source $S_3$ of A.C. voltage is connected between terminals $t_{13}$ and $t_{23}$. In FIG. 1 a full wave rectifier r was used to apply half cycles of voltage of the same polarity across the output circuit of the amplifier $Q_1$ and across the series circuit comprised of the isolation resistor $IR_1$, a temperature responsive impedance $T_1$ and a resistor $R_1$, but in FIG. 3 the series circuit $IR_3$, $T_3$, $R_3$ is connected between $t_{23}$ and the end of a winding $W_3$ for a motor $M_3$ that is remote from $t_{13}$ to that alternating current flows through it, thus creating an alternating current voltage at the junction $J_3$ of $T_3$ and $R_3$. Both halves of the cycle of that voltage can be clipped, if desired by connecting oppositely poled Zener diodes $Z_3$ and $Z_3'$ in series across $T_3$ and $R_3$. A Darlington configuration of transistors $Q_5$ and $Q_6$ that conducts current in one direction is coupled via a protection diode $d_5$ in parallel with the series circuit $IR_3$, $T_3$, $R_3$, and a Darlington configuration of transistors $Q_7$ and $Q_8$ that conducts current in the opposite direction is coupled via a protection diode $d_6$ in parallel with the series circuit $IR_3$, $T_3$, $R_3$. The junction $J_3$ of $T_3$ and $R_3$ is coupled via a diode $d_7$ to the base of $Q_6$ and via a diode $d_8$ to the base of $Q_8$.

In operation, the output circuit of $Q_5$ presents resistance in series with $W_3$ during a half cycle when $t_{13}$ is positive that has a value controlled by the voltage at $J_3$, and, therefore, by the temperature of $T_3$. $Q_7$ is out of the circuit because it is not conducting. During the other half cycle, $Q_7$ presents a resistance in series with $W_3$ that is controlled by the voltage at $J_3$, and $Q_5$ is not conducting. Diodes $d_7$ and $d_8$ that are respectively connected between $J_3$ and the bases of $Q_6$ and $Q_8$ could be omitted but are used to prevent too high a voltage of nonconducting polarity from being applied to the respective bases. Thus, instead of fully rectifying an A.C. voltage derived from the source $S_3$ and applying it to the input circuit of a single amplifier in such manner as to be in phase with a fully rectified voltage across its output circuit, an unrectified A.C. voltage is applied to the input circuits of two oppositely poled amplifiers having the same A.C. voltage applied across their output circuits so that one amplifier conducts on one half cycle and the other amplifier conducts during the next half cycle. The amount of conduction depends on the voltages at $J_3$ and this in turn depends on the temperature of $T_3$.

Figure 4:
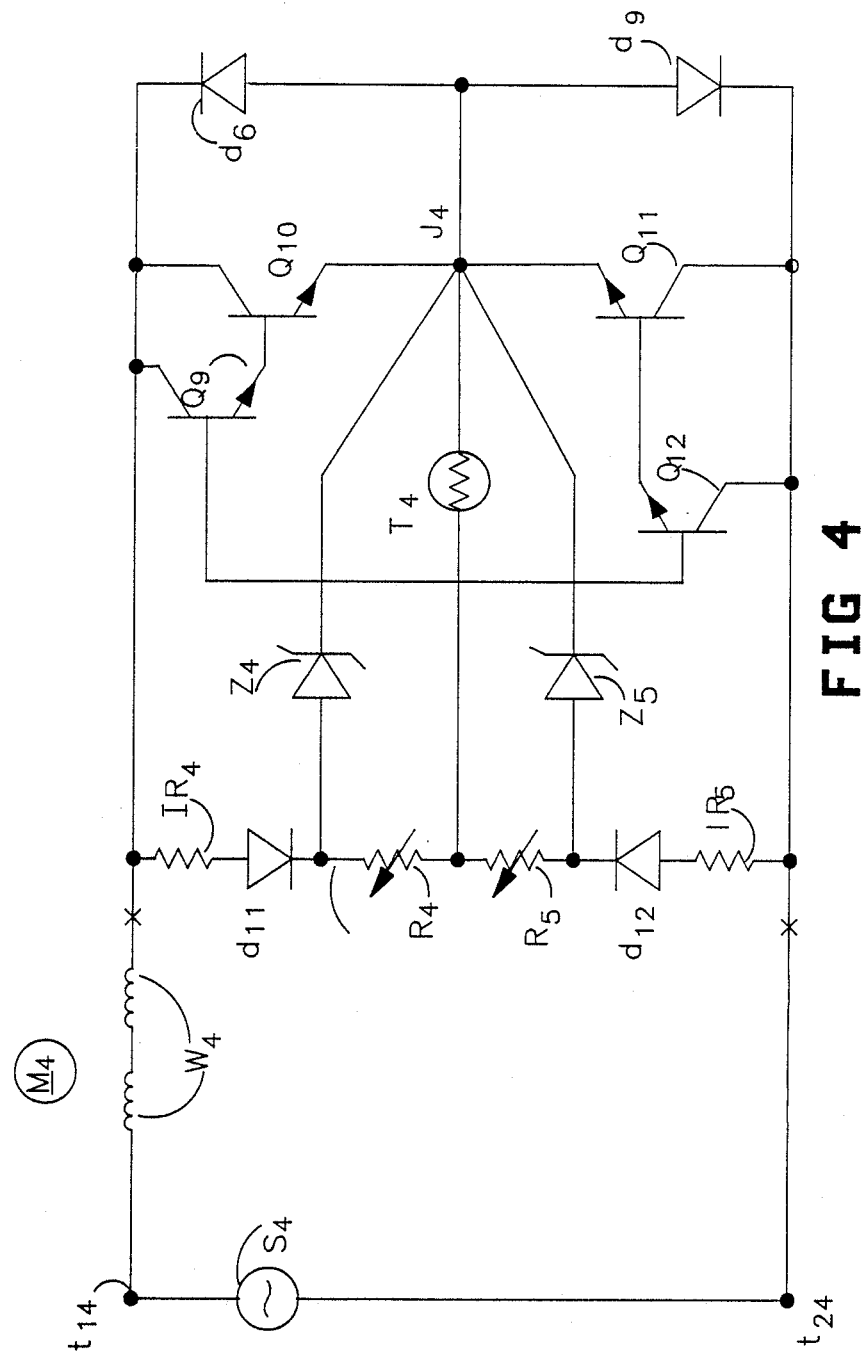
FIG. 4 is a circuit incorporating the invention in which oppositely poled amplifiers are respectively connected in series with respective like poled diodes between the terminals, and different temperature responsive impedance circuits are respectively coupled to the input circuits of the amplifiers.

Reference is now made to a circuit of FIG. 4 that also uses oppositely poled Darlington configurations. A source $S_4$ of alternating current voltage is connected between terminals $t_{14}$ and $t_{24}$. A winding $W_4$ for an alternating current motor $M_4$ is connected in series with a Darlington configuration of transistors $Q_9$, $Q_{10}$ ad a diode $d_9$ between the terminals $t_{14}$ and $t_{24}$, and a Darlington configuration $Q_{11}$, $Q_{12}$ is connected in series with a diode $d_{10}$ between $t_{24}$ and the winding $W_4$. The transistors $Q_9$, $Q_{10}$ and the diode $d_9$ are so poled that current flows through them and the winding $W_4$ during a half cycle when $t_{14}$ is positive, and the transistors $Q_{11}$, $Q_{12}$ and the diode $d_{10}$ are so poled that current flows through them and the winding $W_4$ during a half cycle when $t_{24}$ is positive. The emitters of $Q_{10}$ and $Q_{11}$ and the anodes of the diodes $d_9$ and $d_{10}$ are connected to a junction $J_4$.

An isolation resistor $IR_4$, a protection diode $d_{11}$, a resistor $R_4$ and a temperature responsive impedance $T_4$ are connected in series in the order named between the junction $J_4$ and the end of the winding $W_4$ remote from $t_{14}$ and the junction $J_4$. A Zener diode $Z_4$ is connected in parallel with $R_4$ and $T_4$. An isolation resistor $IR_5$, a protection diode $d_{12}$ and a resistor $R_5$ are connected in series in the orders named between the terminal $t_{24}$ and a junction $J_5$ of $R_4$ and $T_4$, and a Zener diode $Z_5$ is connected in parallel with $R_5$ and $T_4$. The junction $J_5$ is connected to the bases of $Q_9$ and $Q_{12}$.

During a half cycle of voltage making $t_{14}$ positive, a positive half cycle of voltage is applied across the output circuit of $Q_{10}$ and an in phase with positive half cycle of voltage appearing at the junction $J_5$ is applied to the base of $Q_9$ so as to be coupled to the base of the amplifier $Q_{10}$. The amplitude of the latter half cycle of voltage is determined by the temperature of $T_4$. As its temperature increases, the amplitude of the half cycle of voltage at $J_5$ increases. When it exceeds 2Vbe, it increases the conductivity of $Q_{10}$ and lessens its resistive impedance. This increases the current through the winding $W_4$ and speeds up the motor $M_4$ as required.

During an adjacent half cycle when the terminal $t_{24}$ is positive, an identical action takes place to increase the current in $Q_{11}$ by an amount depending on the temperature of $T_4$.

The circuits of FIG. 3 and FIG. 4 can be made to operate with a motor winding that is in shunt with the output circuits of the amplifiers $Q_5$, $Q_7$ of FIG. 3 and $Q_{10}$, $Q_{11}$ of FIG. 4 by substituting the portion of the circuit of FIG. 2 that is to the left of the X's for the portions of the circuits of FIGS. 3 and 4 that are to to the left of the X's therein. In FIG. 3 the positions of $T_3$ and $R_3$ could be exchanged or $T_3$ could have a positive temperature coefficient. The use of Zener diodes permits the temperature at which the speed of the motor starts to increase to be set more accurately.

All of these circuits include means for coupling an output circuit of an amplifier between terminals to which the excitation voltage for an A.C. fan motor is applied and means for coupling a series circuit comprised of a resistor and a temperature responsive impedance to said terminals and to the input circuit of the amplifier so as to apply thereto half cycles of voltage that are in phase with the half cycles coupled across said output circuit. The amplitude of the half cycles applied to the input circuit is determined by the temperature of the temperature responsive impedance, and the winding of an A.C. motor is connected in series or parallel with the output circuit of the amplifier.

I claim:

1. A circuit for controlling the speed of an alternating current motor for driving a cooling fan in accordance with the temperature of a given point comprising a pair of terminals benzene which an alternating current voltage is to be applied, amplifying means having input circuit means and output circuit means, means for coupling said output circuit means between said terminals, a series circuit comprised of a resistive impedance and a temperature responsive impedance meeting at a junction, means coupling a Zener diode in parallel with said series circuit, means for coupling said series circuit to said terminals, means for coupling said junction to said input circuit means of said amplifier so as to continuously vary the current flowing in said output circuit means by applying thereto a voltage that is continuously in phase with voltage across said output circuit and has an amplitude varying with the temperature of said temperature responsive impedance, an alternating current motor having a winding, and means for coupling said winding to the output circuit of said amplifier in such manner that variations in current in said output circuit causes variations in current in said winding.

2. A circuit for controlling the speed of an alternating current motor for a cooling fan in response to variations in temperature occurring at a given point comprising a pair of terminals, a diode bridge full wave rectifying circuit having first and second diagonals, an alternating current motor having a winding, means for connecting said winding benzene one of said terminals and one end of said first diagonal, means for connecting the other terminal to the other end of said first diagonal, an amplifier having an input circuit and an output circuit, means for coupling said output circuit between the ends of said second diagonal, a series circuit comprised of an isolation impedance, a resistive impedance and a temperature responsive impedance connected in parallel with said output circuit, said resistive impedance and said temperature responsive impedance meeting at a junction, and a Zener diode connected in parallel with said resistive impedance and said temperature responsive impedance, and means for coupling said junction to the input circuit of said amplifier so as to control the current in said output circuit with voltage appearing at said junction.

3. A circuit for controlling the speed of an alternating current motor for driving a cooling fan so to prevent the temperature at a point from exceeding a given value comprising:

first and second terminals for connection to respective sides of a source of alternating current voltage, an A.C. motor having speed control windings, amplifying means having an input circuit and an output circuit, means coupling said windings and the output circuit of said amplifying means so that the conductivity of said output circuit affects the amount of A.C. current flowing through said windings during successive half cycles of said alternating current voltage, a series circuit comprised of a resistive impedance and a temperature responsive resistive impedance, means including an isolation impedance connected in series with said series circuit for connecting said series circuit between said first and second terminals, a Zener diode connected in parallel with said series circuit, and means coupled between said series circuit and the input circuit of said amplifying means for controlling the conductivity of the output circuit of said amplifying means in response to the voltage across one of said resistive impedance and said temperature responsive resistive impedance.

4. A circuit as set forth in claim 1 further comprising a second Zener diode, and means connecting said second Zener diode in parallel with one of said resistive impedance and said temperature responsive impedance so as to introduce a minimum amount of voltage into the input circuit of said amplifier even when said temperature responsive impedance has a value corresponding to ambient temperature.

5. A circuit as set forth in claim 1 further comprising means for producing light in accordance with the amount of current passing through it, means including a temperature responsive impedance coupled to said means for producing light so as to control the amount of current passing through it, and means for controlling the voltage introduced into the input circuit of said amplifier in response to the light produced by said means for producing light.

6. A circuit as set forth in claim 1 further comprising means for producing light in accordance with the amount of current passing throught it, means coupled to said means for producing light so as to control the amount of current passing through it, and means for controlling the voltage introduced into the input circuit of said amplifier in response to the light produced by said means for producing light.

* * * * *